(12) United States Patent
Heikman et al.

(10) Patent No.: US 11,903,113 B2
(45) Date of Patent: *Feb. 13, 2024

(54) IMAGE ANALYSIS TECHNIQUES

(71) Applicant: IDEAL Industries Lighting LLC, Racine, WI (US)

(72) Inventors: Sten Heikman, Goleta, CA (US); Yuvaraj Dora, Goleta, CA (US); Ronald W. Bessems, Celebration, FL (US); John Roberts, Durham, NC (US); Robert D. Underwood, Santa Barbara, CA (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,111

(22) Filed: Jan. 18, 2022

(65) Prior Publication Data

US 2022/0141939 A1 May 5, 2022

Related U.S. Application Data

(63) Continuation of application No. 15/887,096, filed on Feb. 2, 2018, now Pat. No. 11,229,107.

(Continued)

(51) Int. Cl.
*H05B 47/125* (2020.01)
*G06T 7/246* (2017.01)
(Continued)

(52) U.S. Cl.
CPC ..... *H05B 47/125* (2020.01); *G06F 18/24143* (2023.01); *G06T 7/248* (2017.01);
(Continued)

(58) Field of Classification Search
CPC . H05B 47/125; H05B 47/13; G06F 18/24143; G06T 7/248; G06T 7/254;
(Continued)

(56) References Cited

U.S. PATENT DOCUMENTS 9,078,048 B1 7/2015 Gargi et al.
2002/0168091 A1 11/2002 Trajkovic
(Continued)

FOREIGN PATENT DOCUMENTS

CN 104813340 A 7/2015
EP 2312524 A1 4/2011
(Continued)

OTHER PUBLICATIONS

Non-Final Office Action for U.S. Appl. No. 15/887,096, dated May 3, 2019, 13 pages.
(Continued)

*Primary Examiner* — Jianxun Yang
(74) *Attorney, Agent, or Firm* — Withrow & Terranova, P.L.L.C.

(57) ABSTRACT

A method includes the steps of obtaining a frame from an image sensor, the frame comprising a number of pixel values, detecting a change in a first subset of the pixel values, detecting a change in the second subset of the pixel values near the first subset of the pixel values, and determining an occupancy state based on a relationship between the change in the first subset of the pixel values and the second subset of the pixel values. The occupancy state may be determined to be occupied when the change in the first subset of the pixel values is in a first direction and the change in the second subset of the pixel values is in a second direction opposite the first direction.

20 Claims, 12 Drawing Sheets

FRAME 1
DETECTION FLAG COUNTER = 1

FRAME 2
DETECTION FLAG COUNTER = 2

FRAME 3
DETECTION FLAG COUNTER = 3

Related U.S. Application Data

(60) Provisional application No. 62/455,331, filed on Feb. 6, 2017.

(51) Int. Cl.
| | |
|---|---|
| *G06T 7/254* | (2017.01) |
| *G06V 10/145* | (2022.01) |
| *G06V 10/44* | (2022.01) |
| *G06V 20/52* | (2022.01) |
| *G06F 18/2413* | (2023.01) |
| *G06V 10/764* | (2022.01) |
| *G06V 10/82* | (2022.01) |
| *H05B 47/13* | (2020.01) |

(52) U.S. Cl.
CPC ............ *G06T 7/254* (2017.01); *G06V 10/145* (2022.01); *G06V 10/454* (2022.01); *G06V 10/764* (2022.01); *G06V 10/82* (2022.01); *G06V 20/52* (2022.01); *G06T 2207/20021* (2013.01); *H05B 47/13* (2020.01)

(58) Field of Classification Search
CPC ........ G06T 2207/20021; G06V 10/145; G06V 10/454; G06V 10/764; G06V 10/82; G06V 20/52; Y02B 20/40
See application file for complete search history.

(56) References Cited

U.S. PATENT DOCUMENTS

| | | | | |
|---|---|---|---|---|
| 2004/0095557 A1* | 5/2004 | Yamada | ................. | H04N 5/145 |
| | | | | 348/E5.066 |
| 2008/0181507 A1 | 7/2008 | Gope et al. | | |
| 2011/0150287 A1* | 6/2011 | Flosdorf | ................. | G06T 7/246 |
| | | | | 382/107 |
| 2015/0008831 A1* | 1/2015 | Carrigan | ................ | H05B 45/22 |
| | | | | 315/153 |
| 2015/0154453 A1* | 6/2015 | Wilf | ........................ | G06T 17/00 |
| | | | | 382/103 |
| 2016/0191879 A1* | 6/2016 | Howard | ............... | H04N 9/3147 |
| | | | | 348/745 |
| 2017/0228874 A1 | 8/2017 | Roberts | | |

FOREIGN PATENT DOCUMENTS

| | | |
|---|---|---|
| JP | 2004157908 A | 6/2004 |
| JP | 2015138319 A | 7/2015 |
| WO | 2013171612 A1 | 11/2013 |

OTHER PUBLICATIONS

Non-Final Office Action for U.S. Appl. No. 15/887,096, dated May 15, 2019, 16 pages.
Final Office Action for U.S. Appl. No. 15/887,096, dated Sep. 3, 2019, 19 pages.
Advisory Action for U.S. Appl. No. 15/887,096, dated Dec. 18, 2019, 3 pages.
Non-Final Office Action for U.S. Appl. No. 15/887,096, dated Jun. 15, 2020, 17 pages.
Applicant-Initiated Interview Summary for U.S. Appl. No. 15/887,096, dated Sep. 18, 2020, 3 pages.
Final Office Action for U.S. Appl. No. 15/887,096, dated Oct. 22, 2020, 18 pages.
Advisory Action and Examiner-Initiated Interview Summary for U.S. Appl. No. 15/887,096, dated Jan. 26, 2021, 4 pages.
Non-Final Office Action for U.S. Appl. No. 15/887,096, dated May 27, 2021, 16 pages.
Notice of Allowance for U.S. Appl. No. 15/887,096, dated Sep. 15, 2021, 7 pages.
First Office Action for Chinese Patent Application No. 2018800241644, dated Jan. 26, 2021, 13 pages.
International Search Report and Written Opinion for International Patent Application No. PCT/US2018/016626, dated May 8, 2018, 14 pages.
International Preliminary Report on Patentability for International Patent Application No. PCT/US2018/016626, dated Aug. 15, 2019, 9 pages.
Examination Report for European Patent Application No. 18706049.6, dated Sep. 23, 2020, 5 pages.
Examination Report for European Patent Application No. 18706049.6, dated Dec. 23, 2021, 5 pages.
Notice of Reason for Rejection for Japanese Patent Application No. 2019-542539, dated Nov. 20, 2020, 6 pages.
Decision to Grant a Patent for Japanese Patent Application No. 2019-542539, dated Apr. 16, 2021, 5 pages.

* cited by examiner

IMAGE ANALYSIS TECHNIQUES

RELATED APPLICATIONS

This application is a continuation of U.S. patent application Ser. No. 15/887,096, filed Feb. 2, 2018, now U.S. Pat. No. 11,229,107, which claims the benefit of U.S. Provisional Patent Application No. 62/455,331, filed Feb. 6, 2017, the disclosures of which are hereby incorporated herein by reference in their entireties.

FIELD OF THE DISCLOSURE

The present disclosure relates to analyzing images to detect desired features, such as motion, occupancy, and the like.

BACKGROUND

Lighting fixtures continue to evolve, incorporating features such as sensors, processing circuitry, networking circuitry, and the like. Accordingly, lighting fixtures may implement lighting programs, respond to the surrounding environment, and be controlled, for example, over a local area network and/or the Internet.

In order to respond to the surrounding environment, lighting fixtures have previously incorporated sensors such as passive infrared (PIR) occupancy sensors and photodiode-based ambient light sensors. While these conventional sensors have generally proved suitable for measuring basic environmental conditions, there is an increasing demand for lighting fixtures capable of measuring more complex environmental conditions and collecting larger amounts of data at higher resolutions. In an effort to provide this additional functionality, it has been proposed to integrate an image sensor into a lighting fixture. While integrating an image sensor into a lighting fixture may increase the resolution at which the lighting fixture is capable of monitoring the surrounding environment, it has proved challenging to derive useful information (e.g., occupancy state and ambient light level) from the large amount of data provided by an image sensor without consuming significant processing resources. The limited processing power available in devices such as lighting fixtures has necessitated the development of computationally inexpensive ways to determine one or more desired environmental conditions from image data provided by an image sensor. Thus far, these methods have sacrificed reliability for efficiency and have proven ineffective. Accordingly, many approaches continue to use the aforementioned conventional sensors along with an image sensor thereby increasing the cost and complexity of a device.

In light of the above, there is a need for improved image analysis techniques to determine desired environmental conditions from image data provided by an image sensor. Specifically, there is a need for image analysis techniques that determine one or more environmental conditions efficiently and reliably such that they are capable of implementation in devices with limited processing power.

SUMMARY

In one embodiment, a method includes the steps of obtaining a frame from an image sensor, the frame comprising a number of pixel values, detecting a change in a first subset of the pixel values, detecting a change in the second subset of the pixel values near the first subset of the pixel values, and determining an occupancy state based on a relationship between the change in the first subset of the pixel values and the second subset of the pixel values. The occupancy state may be determined to be occupied when the change in the first subset of the pixel values is in a first direction and the change in the second subset of the pixel values is in a second direction opposite the first direction. By using the relationship between the first subset of the pixel values and the second subset of the pixel values to determine the occupancy state, the occupancy state may be reliably and efficiently determined.

In one embodiment, the occupancy state is determined to be occupied when the change in the first subset of the pixel values is above a first threshold and the change in the second subset of the pixel values is above a second threshold.

In one embodiment, the pixel values are luma values.

In one embodiment, the change in the first subset of the pixel values is based on a difference between the first subset of the pixel values and a running average of the first subset of the pixel values and the change in the second subset of the pixel values is based on a difference between the second subset of the pixel values and a running average of the second subset of the pixel values.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
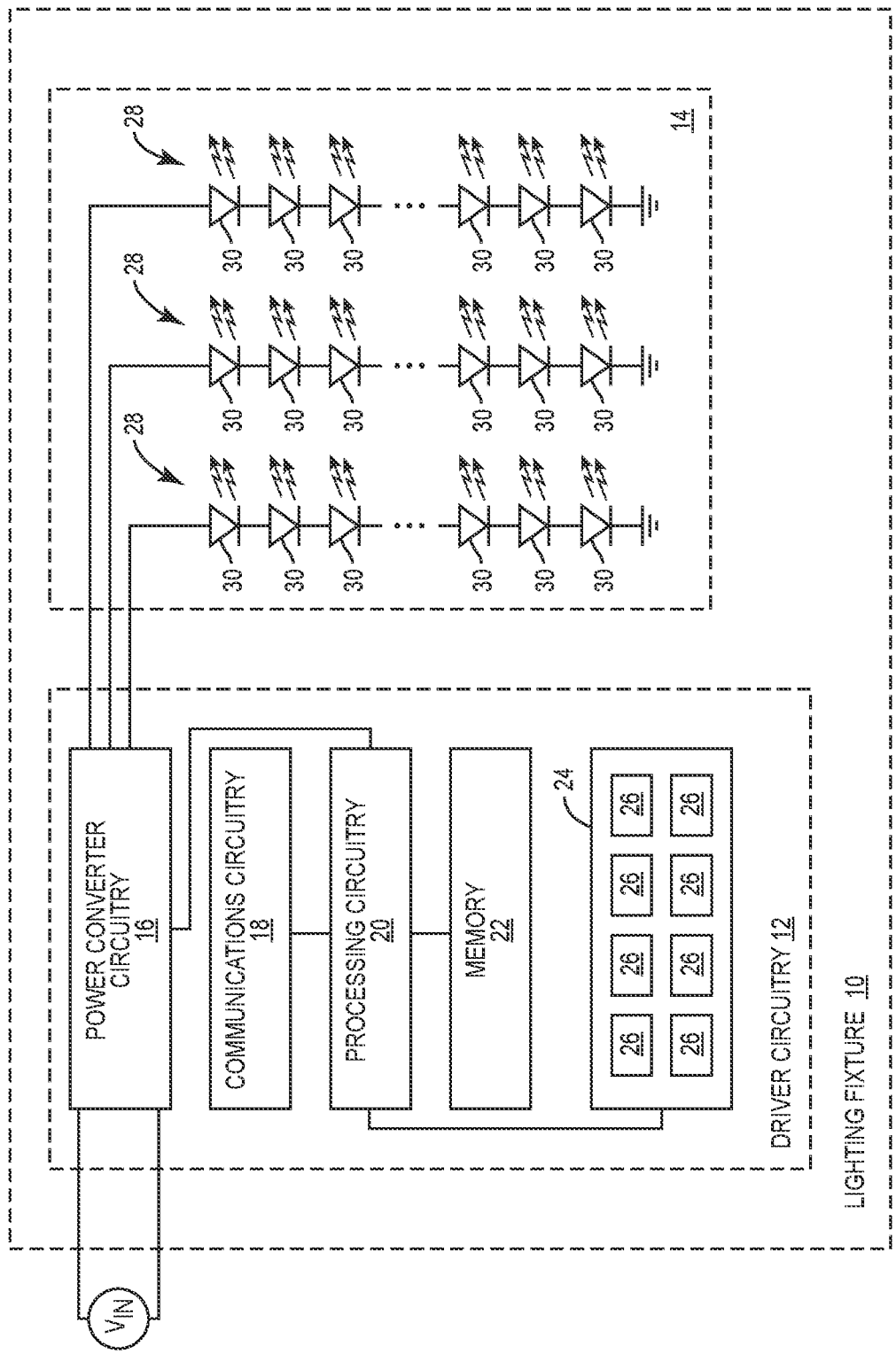
FIG. 1 illustrates a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a block diagram illustrating details of a lighting fixture 10 according to one embodiment of the present disclosure. The lighting fixture 10 includes driver circuitry 12 and an array of light emitting diodes (LEDs) 14. The driver circuitry 12 includes power converter circuitry 16, communications circuitry 18, processing circuitry 20, a memory 22, and sensor circuitry 24. The power converter circuitry 16 is configured to receive an alternating current (AC) or direct current (DC) input signal ($V_{IN}$) and perform power conversion to provide a regulated output power to the array of LEDs 14. Notably, the power converter circuitry 16 may be configured such that the input signal ($V_{IN}$) is provided in whole or in part by a battery, such that the lighting fixture 10 is portable, capable of operating in emergencies such as power outages, and/or capable of being used in one or more off-grid applications as discussed below. In one embodiment, the power converter circuitry 16 is configured to provide a pulse-width modulated (PWM) regulated output signal to the array of LEDs 14. While not shown, a connection between the power converter circuitry 16 and each one of the communications circuitry 18, the processing circuitry 20, the memory 22, and the sensor circuitry 24 may provide regulated power to these portions of the driver circuitry 12 as well. The processing circuitry 20 may provide the main intelligence of the lighting fixture 10, and may execute instructions stored in the memory 22 in order to do so. The processing circuitry 20 may thus control the amount of current, voltage, or both provided from the power converter circuitry 16 to the array of LEDs 14. The communications circuitry 18 may enable the lighting fixture 10 to communicate via wireless or wired signals to one or more other lighting fixtures, sensor modules, controllers, border routers, switches, or any other devices. The communications circuitry 18 may be coupled to the processing circuitry 20 such that information received via the communications circuitry 18 can be considered and acted upon by the processing circuitry 20. The sensor circuitry 24 may include any number of different sensors 26. For example, the sensor circuitry 24 may include one or more passive infrared (PIR) occupancy sensors, one or more ambient light sensors, one or more microphones, one or more speakers, one or more ultrasonic sensors and/or transducers, one or more infrared receivers, one or more imaging sensors such as a camera, a multi-spectral imaging sensor, or the like, one or more atmospheric pressure sensors, one or more temperature and/or humidity sensors, one or more air quality sensors such as oxygen sensors, carbon dioxide sensors, volatile organic compound (VOC) sensors, smoke detectors, and the like, one or more positioning sensors such as accelerometers, Global Positioning Satellite (GPS) sensors, and the like, one or more magnetic field sensors, or any other sensors. The sensor circuitry 24 may be in communication with the processing circuitry 20 such that information from the sensors 26 can be considered and acted upon by the processing circuitry 20. In some situations, the processing circuitry 20 may use information from the sensors 26 to adjust the voltage and/or current provided from the power converter circuitry 16 to the array of LEDs 14, thereby changing one or more aspects of the light provided by the lighting fixture 10. In other situations, the processing circuitry 20 may communicate information from the sensors 26 via the communications circuitry 18 to one or more of the devices or one or more of the border routers in a distributed lighting network, or to one or more of the remote devices. In still other situations, the lighting fixture 10 may both change one or more aspects of the light provided therefrom based on information from the one or more sensors 26 and communicate the information from the one or more sensors 26 via the communications circuitry 18.

The array of LEDs 14 includes multiple LED strings 28. Each LED string 28 includes a number of LEDs 30 arranged in series between the power converter circuitry 16 and ground. Notably, the disclosure is not limited to lighting fixtures 10 having LEDs 30 arranged in this manner. The LEDs 30 may be arranged in any series/parallel combination, may be coupled between contacts of the power converter circuitry 16, or arranged in any other suitable configuration without departing from the principles described herein. The LEDs 30 in each one of the LED strings 28 may be fabricated from different materials and coated with different phosphors such that the LEDs 30 are configured to provide light having different characteristics than the LEDs 30 in each other LED string 28. For example, the LEDs 30 in a first one of the LED strings 28 may be manufactured such that the light emitted therefrom is green, and include a phosphor configured to shift this green light into blue light. Such LEDs 30 may be referred to as blue-shifted green (BSG) LEDs. The LEDs 30 in a second one of the LED strings 28 may be manufactured such that the light emitted therefrom is blue, and include a phosphor configured to shift this blue light into yellow light. Such LEDs 30 may be referred to as blue-shifted yellow (BSY) LEDs. The LEDs 30 in a third one of the LED strings 28 may be manufactured to emit red light, and may be referred to as red (R) LEDs. The light output from each LED string 28 may combine to provide light having a desired hue, saturation, brightness, etc. Any different types of LEDs 30 may be provided in each one of the LED strings 28 to achieve any desired light output. The power converter circuitry 16 may be capable of individually changing the voltage and/or current provided through each LED string 28 such that the hue, saturation, brightness, or any other characteristic of the light provided from the array of LEDs 30 can be adjusted.

Figure 2:
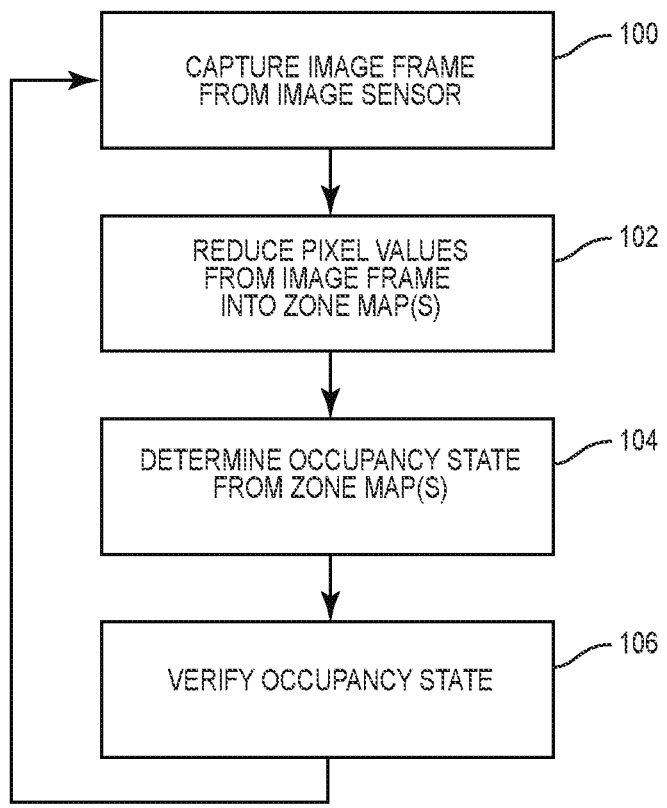
FIG. 2 is a flow chart illustrating a method for determining an environmental condition from image data according to one embodiment of the present disclosure.

As discussed above, it is often desirable to include an image sensor in the sensor circuitry 24. Further, it is desirable to use the image sensor to determine one or more environmental conditions such as occupancy state and ambient light level. Accordingly, FIG. 2 is a flow chart illustrating a method for determining an occupancy state based on image data from an image sensor. As discussed herein, an occupancy state indicates whether an area of interest is occupied or unoccupied by a person or other object of interest (e.g., a vehicle such as a forklift). The occupancy state may thus be occupied or unoccupied.

First, an image frame is captured by the image sensor (step 100). As discussed herein, an image frame is a data structure including a number of pixel values representing the light detected by the image sensor at a particular moment of time. The pixel values may be formatted in any number of ways and may include, for example, values representing an intensity of light detected for a number of color channels (e.g., red, green, and blue). Spatial data is associated with each of the pixel values so that they are associated with a particular part of the image frame. Accordingly, the image frame can be thought of as a matrix of pixel values, wherein each pixel value describes the light captured in a portion of the image frame. Capturing the image frame from the image sensor may involve reading the image data off a serial bus coupled to the image sensor; however, the image frame may be obtained in any suitable manner from the image sensor. For example, a downsampled version of the image frame may be obtained by reading values from one or more registers associated with the image sensor such as series of auto exposure values maintained in the course of an auto exposure process for the image sensor. As discussed above, the image frame is relatively high resolution when compared to the data obtained by conventional sensors. Accordingly, determining environmental conditions from the image frame may be relatively difficult without consuming significant processing resources.

In an effort to increase the efficiency of determining one or more environmental conditions from the image frame or a number of image frames, the pixel values in the image frame are divided into zones and reduced to form one or more zone maps (step 102). For example, the image frame may be separated into four, five, six, seven, eight, nine, or any other number of zones each including a subset of the pixel values. The pixel values in these zones may then be reduced to a zone value which is an aggregate of the pixel values in the zone. In one embodiment, reducing the pixel values within a zone to a zone value is done by averaging the pixel values. The pixel values themselves may be individually reduced into a single value (e.g., by combining the separate intensity information for the different color channels into a single value such as luma or luminance) before reducing the pixel values within each zone to a zone value. In another embodiment, reducing the pixel values within a zone to a zone value is done by summing the pixel values. The result is a significantly downscaled image frame that is much easier to analyze and thus determine environmental conditions from. The size of each one of the zones and thus the number of zones the image frame is separated into may be determined based on the size of an object of interest within the image frame associated with the detection of an environmental condition. For example, the zones may be sized approximately equal to the size a person will appear in the image frame to detect an occupancy state.

Next, the occupancy state is determined based on the one or more zone maps (step 104). Determining the occupancy state based on the one or more zone maps may involve analyzing the zone maps according to a set of rules to detect when a person or other object of interest is present in the image frame while ignoring objects in the image frame which do not indicate occupancy (e.g., shadows, nearby lights turning on or off, small animals, etc.). Details regarding determining the occupancy state from the one or more zone maps are discussed below. Finally, the occupancy state may be verified (step 106). Verifying the occupancy state may involve further screening the zone maps for false positive events and thus making sure that the occupancy detected in the previous step was correct. In various embodiments, the last two steps are combined into a single step such that verifying the occupancy state is simply part of determining the occupancy state.

Figure 3:
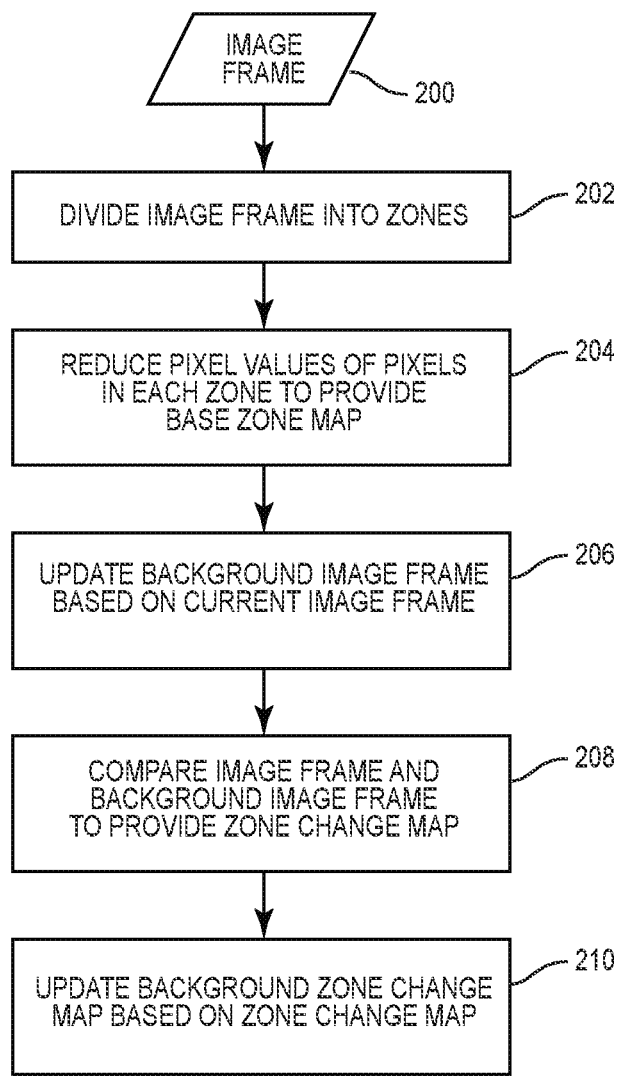
FIG. 3 is a flow chart illustrating a method for determining an environmental condition from image data according to one embodiment of the present disclosure.

FIG. 3 is a flow chart illustrating details of reducing the pixel values from the image frame into one or more zone maps (step 102 in FIG. 2) according to one embodiment of the present disclosure. The process begins with the image frame (step 200). The image frame is divided into zones (step 202) as discussed above. Notably, the size and thus number of zones the image frame is separated into is dependent on the size an object of interest related to the environmental condition being determined appears in the image frame. The pixel values within each one of these zones are then reduced to provide a base zone map (step 204). For example, as discussed above the pixel values in each zone may be summed or averaged such that the image frame is downscaled and described by a number of zone values, where the number of zone values are significantly less than the number of pixel values. As discussed above, each one of the pixel values may be reduced into a single value or a smaller value before reducing the pixel values in each zone to a zone value. For example, the pixel values may each be reduced to a luma or luminance value and then summed or averaged into a zone value such that the zone values describe an average luma or luminance within the zone.

The image frame may be used to update a background image frame (step 206) for use in the construction of one or more additional zone maps as discussed below. As discussed herein, the background image frame is a running average of image frames over time. Accordingly, each one of the pixel values in the background image frame is a running average of corresponding pixel values in a number of image frames obtained over a period of time. Every time an image frame is captured, the background image frame is updated. A simple blending method may be used to update each pixel value in the background image frame as described by Equation (1):

$$PV_{RA} = (PV_I * \alpha) + PV_{RAP} * (1 - \alpha) \quad (1)$$

where $PV_{RA}$ is an updated pixel value in the background image frame, $PV_I$ is a corresponding pixel value in the current image frame, $\alpha$ is a blending factor (e.g., between 0 and 1), and $PV_{RAP}$ is the pixel value in the background image frame to be updated.

A zone change map may be provided by comparing the image frame to the background image frame (step 208). In one embodiment, every pixel value in the background image frame is subtracted from every corresponding pixel value in the image frame to determine how far each pixel value in the image frame deviates from a running average thereof. These pixel value differentials may be reduced into zone differentials by summing or averaging on a zone-by-zone basis to provide a number of zone differentials, which are the zone values for the zone change map.

A background zone change map may also be updated and maintained based on the zone change map (step 210) as described by Equation (2):

$$ZV_{RA} = (ZV_I * \alpha) + ZV_{RAP} * (1 - \alpha) \quad (2)$$

where $ZV_{RA}$ is an updated zone value in the background zone change map, $ZV_I$ is a corresponding zone value in the zone change map, $\alpha$ is a blending factor (e.g., between 0 and 1), and $ZV_{RAP}$ is the zone value in the background zone change map to be updated. The background zone change map thus describes an average amount of change in zone values over a period of time in each zone. The various zone maps discussed above may be used to determine one or more environmental conditions as discussed below.

While specific examples are discussed above, any of the base zone map, the background image frame, the zone change map, and the background zone change map may be constructed at any level of granularity. That is, any degree of downscaling may occur before or during the construction of any of the zone maps to balance efficiency and data retention without departing from the principles discussed herein.

Figure 4:
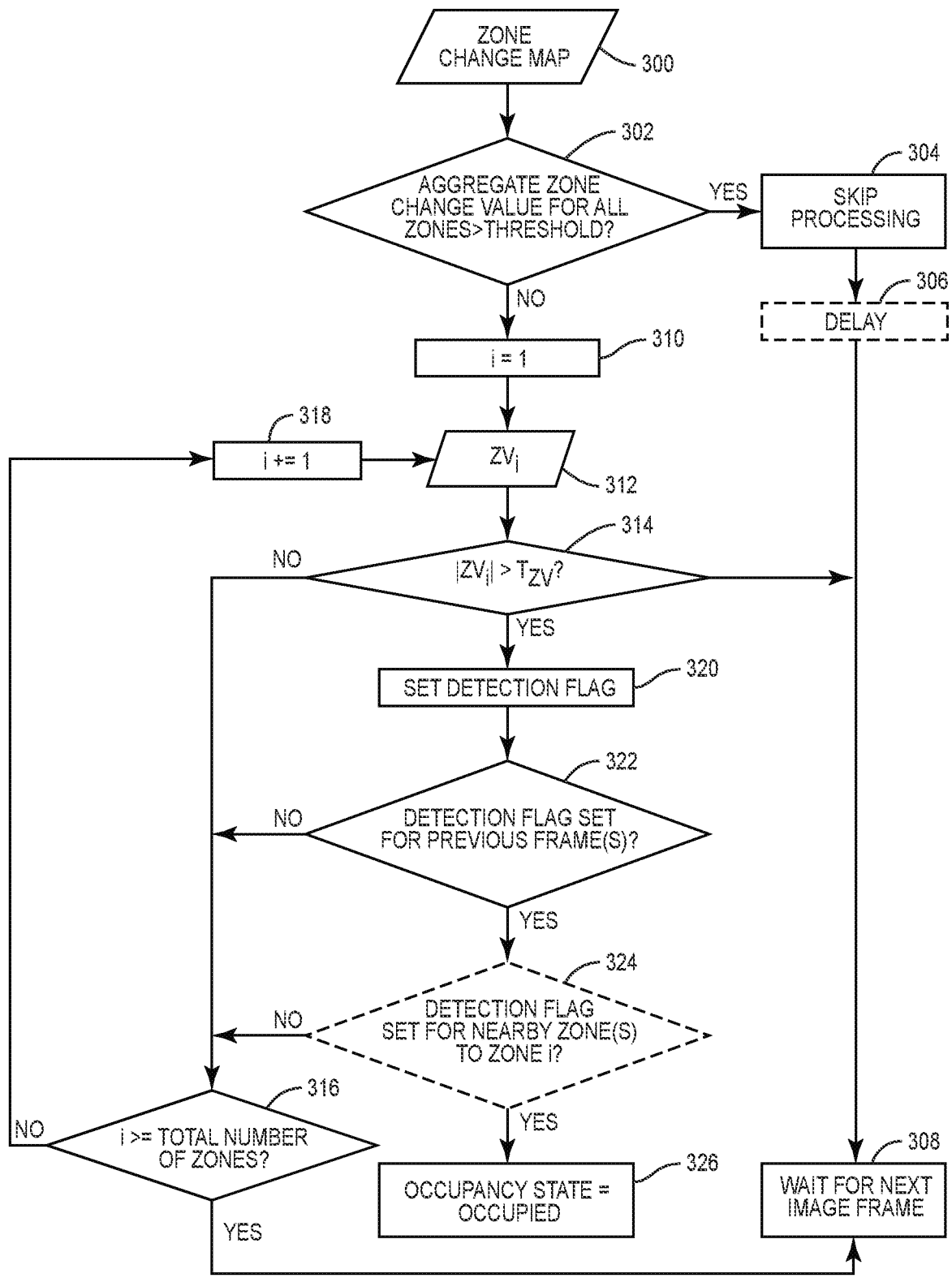
FIG. 4 is a flow chart illustrating a method for determining an environmental condition from image data according to one embodiment of the present disclosure.

FIG. 4 is a flow chart illustrating details of determining an occupancy state from the one or more zone maps (step 104 in FIG. 2) according to one embodiment of the present disclosure. The process begins with the zone change map discussed above with respect to FIG. 3 (step 300). The zone values for each zone in the zone change map are aggregated and compared to a threshold (step 302). In some embodiments, this step may be more intensive, counting and comparing the unaggregated differences in pixel values between the image frame and the background image frame to a threshold rather than the zone values in the zone change map. This step is to check for false alarm events that may trigger a very large change in the pixel values and thus their corresponding zone values, for example, due to a nearby light turning on or off. When all of the zone values change by a significant amount or a large portion of the zone values change by a significant amount (as indicated by the zone values of the zone change map) it is often attributed to a nearby light or the lighting fixture in which the image sensor is integrated either turning on or off. It is thus desirable to ignore these events when determining an occupancy state. Accordingly, if the aggregate zone value for all of the zones in the zone change map is above a threshold (e.g., if a supermajority such as ⅔ of the zone values indicate a significant change) the processing for that image frame is skipped (step 304), an optional delay (e.g., 30 frames) is provided (step 306), and the process proceeds to wait for the next image frame for processing, starting over the process described in FIG. 2 (step 308).

If the aggregate zone value for all of the zones in the zone change map are not above a threshold, the process proceeds to initialize a zone counter i representing the current zone on which the remainder of the process is performed to one (step 310). The zone value for zone i in the zone change map is then obtained (step 312) and compared to a zone value threshold $T_{ZV}$ (step 314). In some embodiments, the absolute value of the zone value $ZV_i$ may be compared to the zone value threshold $T_{ZV}$. If the current zone value $ZV_i$ is not above the zone value threshold $T_{ZV}$, it is checked if the zone counter i is greater than or equal to the total number of zones in the zone change map (step 316). That is, it is checked to determine whether all of the zones have been looped over.

If the zone counter i is greater than or equal to the total number of zones in the change map, the process proceeds again to step 308. If the zone counter i is not greater than or equal to the total number of zones in the change map, the zone counter i is incremented (step 318) and the process begins again for the next zone in the zone change map at step 312. If the current zone value $ZV_i$ is greater than the zone value threshold $T_{ZV}$, a detection flag is set indicating the current zone for which detection is indicated (step 320).

Next, it is determined if a detection flag was set in one or more previous frames to the current image frame from which the zone change map was created (step 322). This step is provided to guard against false alarms due to noise detected by the image sensor or other highly transitory phenomena (e.g., insects flying near the image sensor). In some embodiments, detection flags must be present in multiple previous image frames (e.g., two, three, four, five, etc.) to the current frame before occupancy will be detected. If the detection flags were set for one or more previous frames, it is then optionally determined whether these detection flags were set for nearby zone(s) to the zone for which the current detection flag was set (step 324). In this context, nearby zone(s) may include sequential detection flags set for the same zone. In one embodiment, detection flags must be set for three sequential frames in the same zone or neighboring zones before occupancy is detected, where neighboring zones are zones that share at least one border with one another. Notably, these numbers are merely exemplary. In some embodiments, the number of detection flags required to detect occupancy may be different if the detection flags are in the same zone and neighboring zones. For example, detection flags for x sequential frames in the same zone or for y sequential frames in neighboring zones may be required before occupancy is detected, where x is between 2 and 30 and y is between 4 and 50. Neighboring zones can include any number of zones that share a border with one another. For example, a detection flag may be set for two neighboring zones, three neighboring zones, four neighboring zones, etc. for the required number of frames before occupancy is detected. In one embodiment, a detection flag counter is maintained for each zone. The detection flag counter is incremented for each frame in which a detection flag is set, and decremented for each frame in which a detection flag is not set. When the detection flag counter for a zone reaches a threshold (e.g., between two and twenty, and in one embodiment three), the occupancy state may be determined as occupied.

Figure 5A:
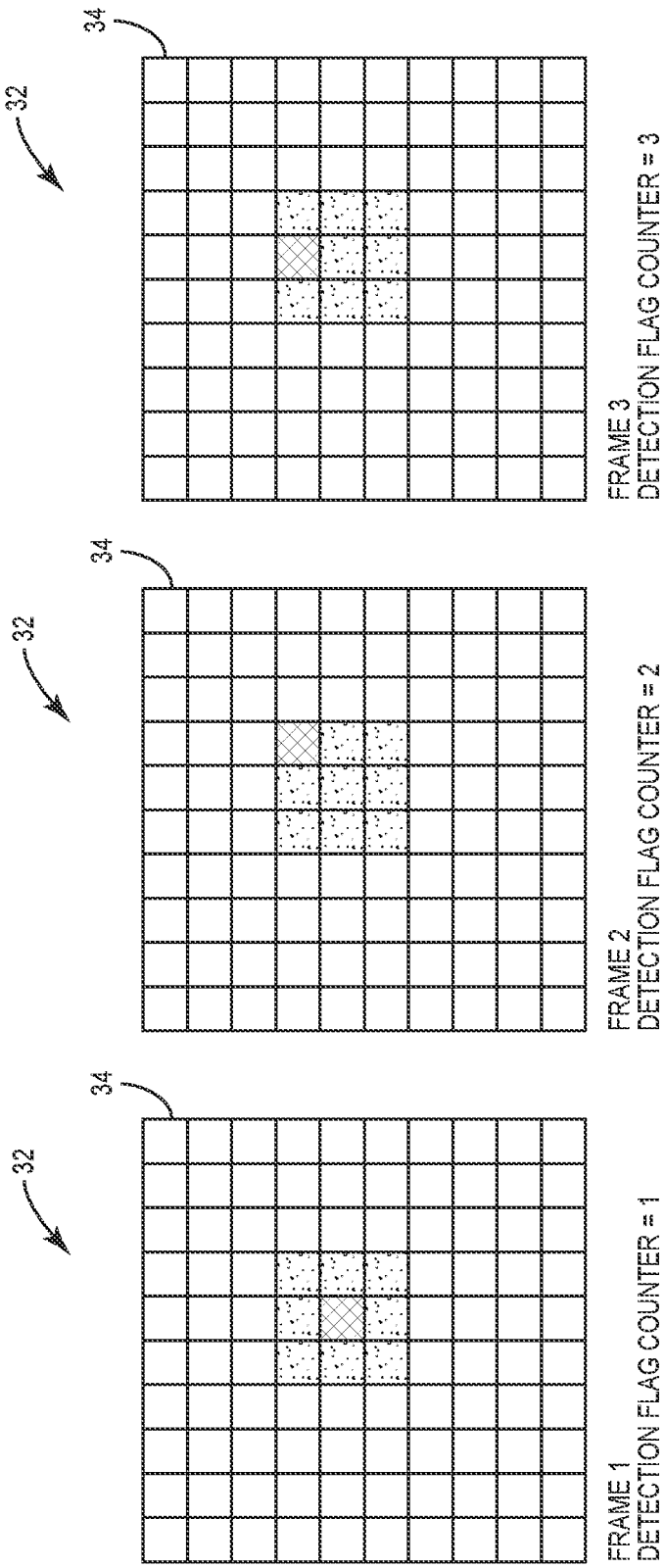
FIGS. 5A through 5C illustrate a process for detecting occupancy according to one embodiment of the present disclosure.
Figure 5B:
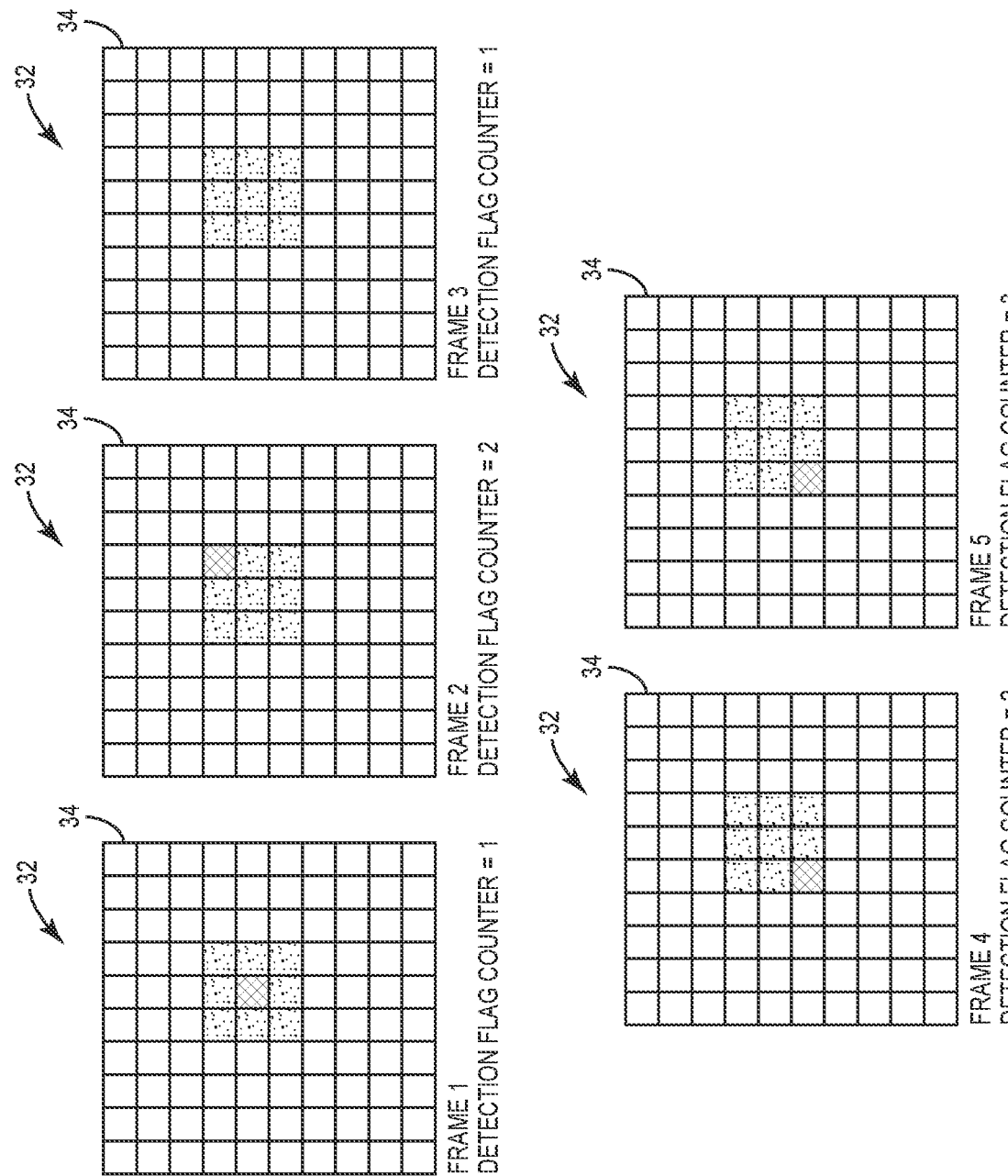
Figure 5C:
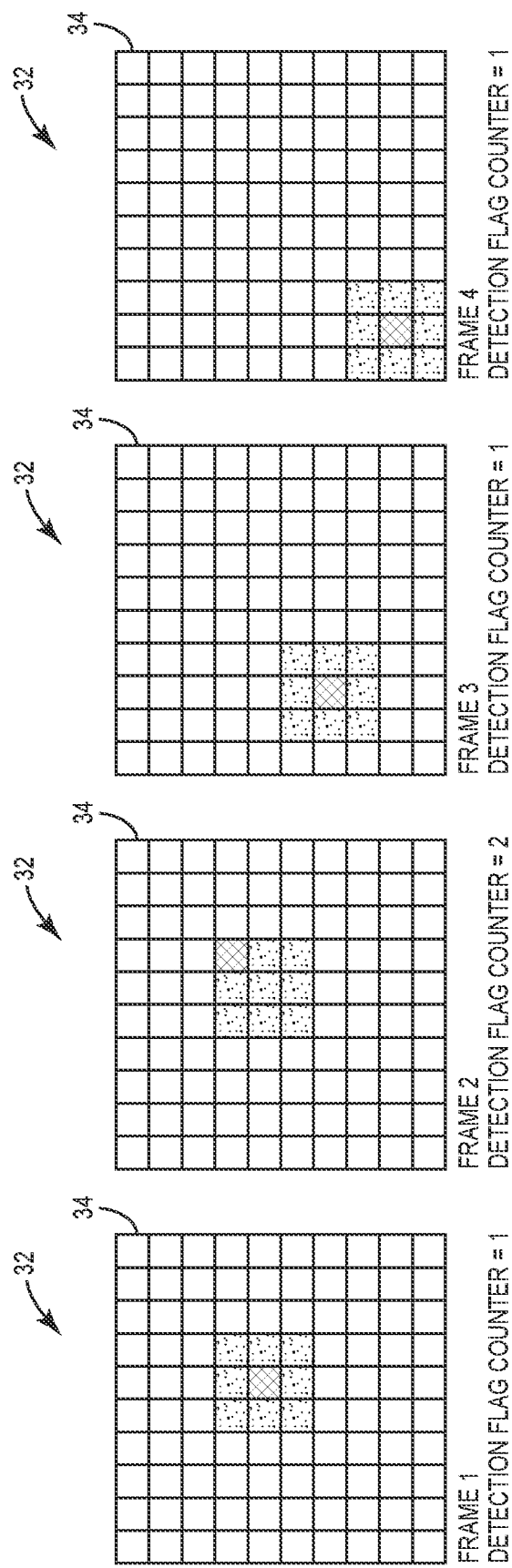

The foregoing is illustrated in FIGS. 5A through 5C. FIG. 5A shows an exemplary series of sequential image frames 32 captured from an image sensor, each of which are divided into a number of zones 34. Hatching in a zone indicates a detection flag being set for that zone. The neighboring zones to the first zone in which a detection flag has been set are illustrated with stippling. In a first one of the image frames 32, a detection flag is set in a first zone. A detection flag counter is incremented in response to the setting of the detection flag. The first zone in which a detection flag is set that is not part of a previous sequential series of detection flags for a set of neighboring zones defines a set of zones in which a detection flag must be set to continue incrementing the detection flag counter as discussed below. This is illustrated by the stippled zones surrounding the first zone. In a second one of the image frames 32, a detection flag is set in a neighboring zone to the first zone, and the detection flag counter is incremented. In a third one of the image frames 32, a third detection flag is set in a neighboring zone to the first zone, and the detection flag counter is incremented. As discussed above, occupancy may be detected when detection flags are set for three sequential frames in the same zone or neighboring zones. That is, occupancy may be detected when the detection flag counter reaches three. In the example shown in FIG. 5A, occupancy may thus be detected in the third one of the image frames 32.

FIG. 5B shows another exemplary series of sequential image frames 32, each of which are divided into a number of zones 34. Again, hatching in a zone indicates a detection flag being set for that zone. The neighboring zones to the zone in which a detection flag has been set are illustrated with stippling. In a first one of the image frames 32, a detection flag is set in a first zone. A detection flag counter is incremented in response to the setting of the detection flag. In a second one of the image frames 32, a detection flag is set in a neighboring zone to the first zone, and the detection flag counter is incremented. In a third one of the image frames 32, no motion is detected and thus a detection flag is not set. In response, the detection flag counter is decremented. In a fourth one of the image frames 32, a detection flag is set in a neighboring zone to the first zone, and the detection flag counter is incremented. In a fifth one of the image frames 32, a detection flag is set in the same zone as in the fourth one of the image frames, and the detection flag counter is incremented. An occupancy event is detected at this time.

FIG. 5C shows another exemplary series of sequential image frames 32, each of which are divided into a number of zones 34. Again, hatching in a zone indicates a detection flag being set for that zone. The neighboring zones to the zone in which a detection flag has been set are illustrated with stippling. In a first one of the image frames 32, a detection flag is set in a first zone. A detection flag counter is incremented in response to the setting of the detection flag. In a second one of the image frames 32, a detection flag is set in a neighboring zone to the first zone, and the detection flag counter is incremented. In a third one of the image frames 32, a detection flag is set for a zone that is not neighboring the first zone. Since the detection flag is not in a neighboring zone to the first zone, the first zone is redefined as the one in which the detection flag occurred and thus redefines the set of zones in which a detection flag must be set to continue incrementing the detection flag counter. Further, this causes the detection flag counter to reset back to one. In a fourth one of the image frames 32, a detection flag is again set for a zone that is not neighboring the first zone that was set in the third one of the image frames 32. This one again redefines the first zone and thus the set of zones in which a detection flag must be set to continue incrementing the detection flag counter. Further, this causes the detection flag counter to reset back to one. An occupancy event is not detected in the series of image frames 32 shown in FIG. 5C, because the detection flags are not neighboring one another in the sequential frames. This may indicate a very fast-moving object for which occupancy should not be detected. By detecting occupancy in this manner, false positives due to these fast-moving objects may be avoided, thus increasing the accuracy of occupancy detection.

This may once again guard against noise or other transitory phenomena wherein a detection is indicated for zones occurring on opposite sides of the frame. If the detection flags were not set for nearby zone(s) to the zone for which the current detection flag was set, the process proceeds again to step 316. If the detection flags were set for nearby zone(s) to the zone for which the current detection flag was set, the occupancy state is determined as occupied (step 326). If a detection flag was not set for one or more previous frames, the occupancy state remains unoccupied and the process proceeds again to step 316.

The process described above is described in further detail in U.S. patent application Ser. No. 15/191,753, now U.S. Pat. No. 10,306,738, the contents of which are hereby incorporated by reference in their entirety. Due to the various safeguards provided in this process, an occupancy state may be reliably determined while avoiding false alarms. Further, since such a process uses the zone change map rather than the image frame itself, it may be performed with minimal processing power. In some scenarios, however, further refinements in occupancy detection may be necessary to avoid false alarm detections. For example, the aforementioned process may have difficulty filtering false alarm detections due to highly specular reflections from nearby lights on a glossy or semi-glossy flooring surface.

Figure 6:
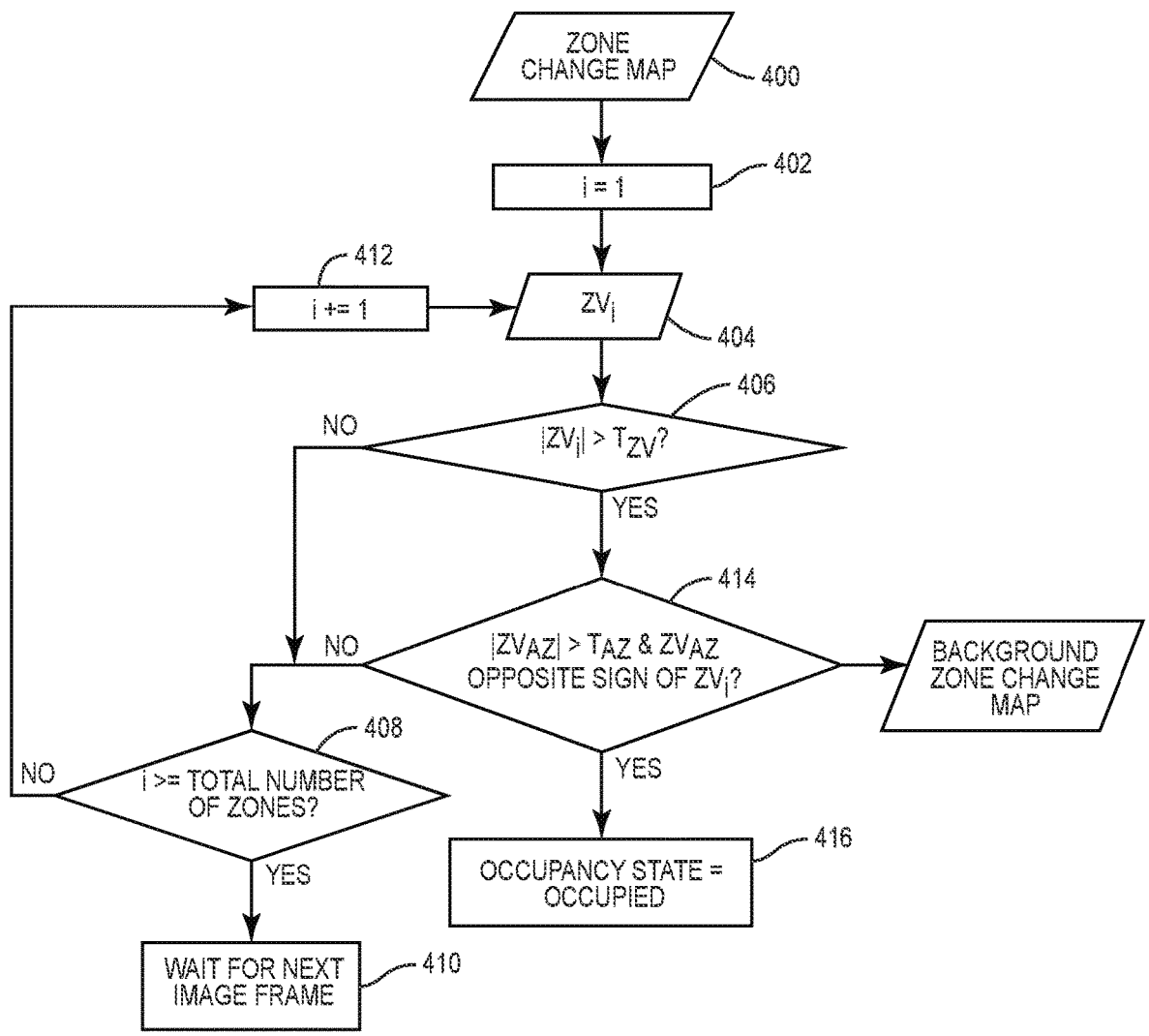
FIG. 6 is a flow chart illustrating a method for determining an environmental condition from image data according to one embodiment of the present disclosure.

Accordingly, FIG. 6 is a flow chart illustrating details of verifying (or in some embodiments independently determining) an occupancy state based on the one or more zone maps (step 106 in FIG. 2). The process starts with the zone change map determined above with respect to FIG. 3 (step 400). Once again, a zone change counter i is initialized to one (step 402), the zone value for zone i in the zone change map is obtained (step 404) and compared to a zone value threshold $T_{ZV}$ (step 406). In some embodiments, the absolute value of the zone value $ZV_i$ may be compared to the zone value threshold $T_{ZV}$. This is because, as discussed above, the zone values in the zone change map may indicate a positive change over the running average of the zone value or a negative change over the running average of the zone value.

This portion of the process may be performed together with the overlapping portion of that described in FIG. 4 or performed independently. If the current zone value $ZV_i$ is not above the zone value threshold $T_{ZV}$, it is checked if the zone counter i is greater than or equal to the total number of zones in the zone change map (step 408). That is, it is checked to determine whether all of the zones have been looped over.

If the zone counter i is greater than or equal to the total number of zones in the zone change map, the process proceeds to wait for the next image frame for processing, starting over the process described in FIG. 2 (step 410). If the zone counter i is not greater than or equal to the total number of zones in the zone change map, the zone counter i is incremented (step 412) and the process begins again for the next zone in the zone change map at step 404. If the current zone value $ZV_i$ is above the zone value threshold $T_{ZV}$, it is determined if a zone value $ZV_{AZ}$ for a zone adjacent to the current zone in the zone change map is above an adjacent zone value threshold $T_{AZ}$ and has an opposite sign to that of the current zone value $ZV_i$ (step 414). In some embodiments, the absolute value of the adjacent zone value $ZV_{AZ}$ may be compared to the adjacent zone value threshold $T_{AZ}$. The adjacent zone value threshold $T_{AZ}$ may be related to the zone value corresponding with the zone of the adjacent zone value $ZV_{AZ}$ in the background zone change map as illustrated by the input provided to step 414. For example, the adjacent zone value threshold $T_{AZ}$ may be equal to $TV*ZV_{AZC}$ where TV is a threshold value between 1.5 and 6 and $ZV_{AZC}$ is the zone value for the zone of the adjacent zone value $ZV_{AZ}$ in the background change map. The adjacent zone value threshold $T_{AZ}$ may also be a constant value such as 800.

The zone value in the zone change map is associated with a sign indicating a direction of change of the zone value in the base zone map. For example, in the case where the zone values in the zone change map represent luma or luminance values, the luma or luminance may increase due to the presence of a bright object in the zone thereby giving the zone value in the zone change map a positive value, or may decrease due to the presence of a dark object in the zone thereby giving the zone value in the zone change map a negative value. The sign of the zone values in the zone change map thus indicates a direction of change. Once it is established that a zone value in the zone change map is above a certain value (indicating that the zone has experienced a significant change in luma or luminance), the zones adjacent to this zone are then checked to see if they have experienced a change in the opposite direction. That is, if the current zone value $ZV_i$ in step 406 is above the zone value threshold $T_{ZV}$, the zone values $ZV_{AZ}$ adjacent to the current zone value $ZV_i$ are then checked to see if they are above the adjacent zone value threshold $T_{AZ}$ and have an opposite sign to the current zone value $ZV_i$. In some embodiments, the zone value threshold $T_{ZV}$ and the adjacent zone threshold $T_{AZ}$ may be equal. In other embodiments, the zone value threshold $T_{ZV}$ and the adjacent zone value $T_{AZ}$ may be different values. Further, the adjacent zone threshold $T_{AZ}$ may be proportional or otherwise dependent on the amount by which the current zone value $ZV_i$ exceeds the zone value threshold $T_{ZV}$.

Step 414 may significantly reduce the rate of false alarm detections of occupancy while consuming minimal processing resources. As discussed above, specular reflections from glossy or semi-glossy floors due to overhead lighting may provide the appearance of a change in pixel values and thus corresponding zone values that appear about the size of an object of interest such as a person. Accordingly, false alarm events may be raised when the light providing the reflection changes state. The inventors of the present disclosure discovered that such false alarm events can be avoided by observing that true motion by an object of interest such as a person (which indicates that an area is occupied) manifests as changes in a first subset of pixel values in one area and corresponding changes in a second subset of pixel values in another nearby area. Specifically, true motion by an object of interest such as a person is indicated when a) the first subset of pixel values changes by a first predetermined amount, b) the second subset of pixel values changes by a second predetermined amount which may or may not be equal to the first predetermined amount, and c) the first subset of pixel values and the second subset of pixel values change in opposite directions.

As an example, if a person with a white shirt moves from a first zone to a second zone in an image frame (wherein the first subset of pixel values is the first zone and the second subset of pixel values is the second zone), the second zone will experience an increase in luma or luminance by a certain amount due to reflections from the white shirt moving into the zone, while the first zone will experience a decrease in luma or luminance by certain amount due to the fact that the white shirt has moved out of the zone and thus is no longer reflecting light there. Here, all of the criteria discussed above are satisfied and an area can therefore be determined to be occupied. In contrast, if a nearby light is turned on and provides a specular reflection in the first zone that increases the luma or luminance in that zone, there will be no other zone that experiences a corresponding decrease in luma or luminance. Accordingly, the criteria discussed above are not satisfied and thus an area can therefore be determined to be unoccupied.

If the zone value $ZV_{AZ}$ for a zone adjacent to the current zone in the zone change map is above the adjacent zone value threshold $T_{AZ}$ and has an opposite sign to that of the current zone value $ZV_i$, the occupancy state is determined to be occupied (step 416). If the zone value $ZV_{AZ}$ for a zone adjacent to the current zone in the zone change map is not above the adjacent zone value threshold $T_{AZ}$ or does not have an opposite sign to that of the current zone value $ZV_i$, the process returns to step 408.

As discussed above, the process discussed in FIG. 6 may be performed together with the process described in FIG. 4 such that overlapping portions thereof are not performed twice. In other embodiments, the process discussed in FIG. 6 may be performed by itself to detect occupancy events. That is, changes in a first subset of pixel values may be detected along with corresponding changes in a second subset of pixel values to determine occupancy. As discussed above, the corresponding changes in the second subset of pixel values may be in an opposite direction of those in the first subset of pixel values, and may be required to be above a certain threshold.

Figure 7:
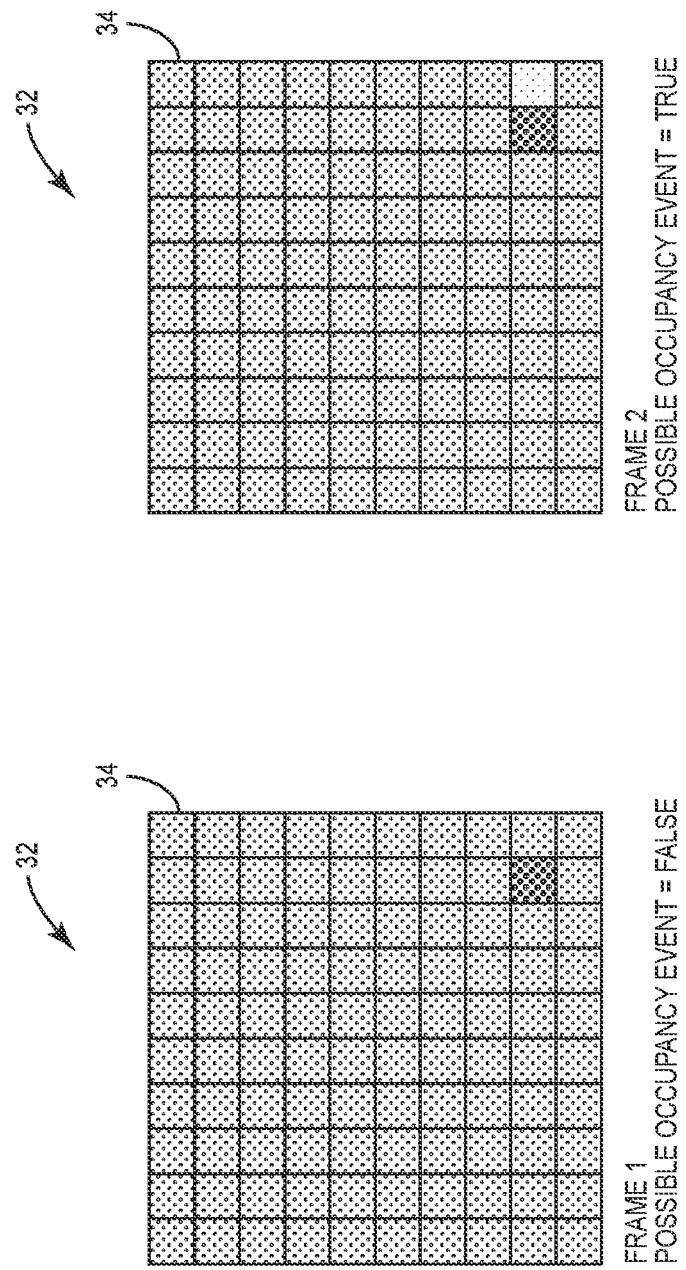
FIG. 7 is a flow chart illustrating a method for determining an environmental condition from image data according to one embodiment of the present disclosure.

FIG. 7 illustrates the principles discussed above. FIG. 7 shows an exemplary series of sequential image frames 32 captured from an image sensor, each of which are divided into a number of zones 34. The shading in each one of the zones 34 indicates the normalized change in brightness for that zone (i.e., how much the brightness has changed for that frame when compared to a background frame as discussed above). In order for occupancy to be detected, a change in brightness in one zone must occur with an opposite change in brightness in a neighboring zone, where a neighboring zone is a zone adjacent to the one in which the brightness change occurred. If such an opposite change in brightness does not occur, it may indicate a false alarm event, for example, caused by reflections from objects in the environment. Such a scenario is indicated in the first frame shown in FIG. 7. However, when a change in brightness in one zone corresponds with an opposite change in brightness in a neighboring zone, occupancy may be detected (subject to the additional conditions discussed above) as indicated in the second frame shown in FIG. 7.

Figure 8:
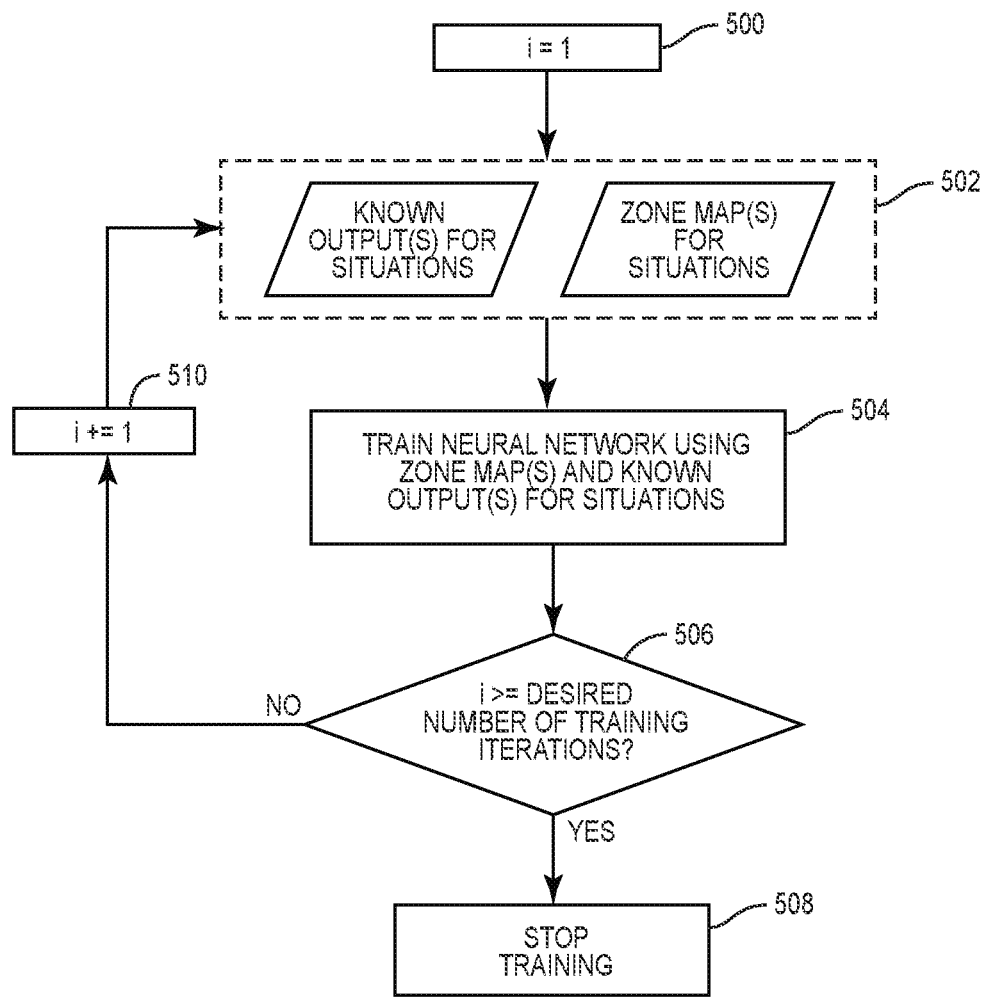
FIG. 8 is a flow chart illustrating a method for determining an environmental condition from image data according to one embodiment of the present disclosure.

In addition to the processes discussed above, detection of one or more environmental conditions may be further refined by using a neural network along with the one or more zone maps. Accordingly, FIG. 8 shows a process of training a neural network for detecting one or more environmental conditions according to one embodiment of the present disclosure. The process starts by initializing a training iteration counter i to one (step 500). A number of known outputs for a situation and a number of zone maps for the situation may then be obtained (step 502). As discussed herein, a situation may be an event or collection of events as collected by one or more image frames from an image sensor. The known outputs may indicate, for example, an occupancy state associated with the zone maps for the situation. In some embodiments, the known outputs may be significantly more complex so as to indicate further characteristics such as a number of detected individuals, the detection of objects (e.g., vehicles such as forklifts), or the like. The zone maps include one or more of the zone maps discussed above with respect to FIG. 3. The known outputs and number of zone maps for the situations are then used to train a neural network (step 504).

It is then checked whether the training iteration counter i is greater than or equal to a desired number of training iterations (step 506). That is, it is checked whether a desired number of training iterations have been performed to calibrate the neural network. If the training iteration counter i is greater than or equal to the desired number of training iterations, the process proceeds to stop training (step 508). If there are more training iterations desired, the situation counter i is incremented (step 510) and the process returns to step 502.

In one embodiment, the neural network is a convolutional neural network; however, any suitable type of neural network may be used without departing from the principles of the present disclosure. By training a neural network using the zone maps, which as discussed above are downscaled versions of an image frame, the neural network may be able to reliably determine environmental conditions such as occupancy with a high degree of efficiency.

Figure 9:
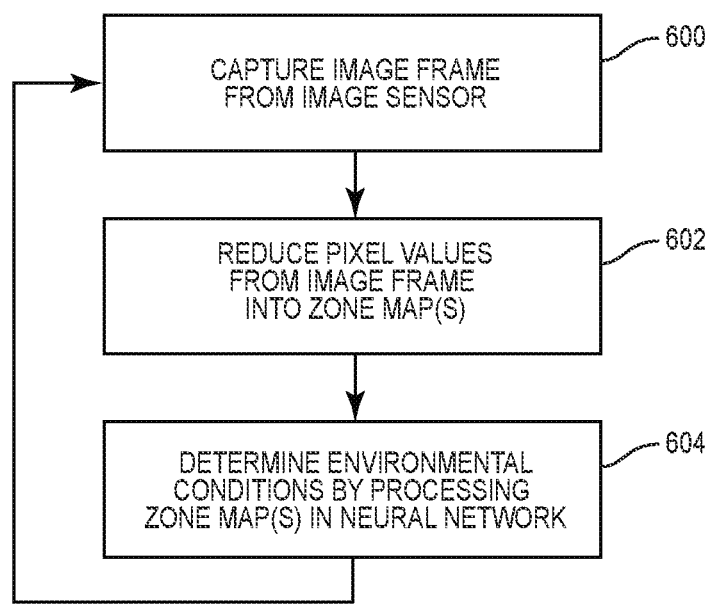
FIG. 9 is a flow chart illustrating a method for determining an environmental condition from image data according to one embodiment of the present disclosure.

FIG. 9 is a flow chart illustrating a process for determining one or more environmental conditions using data from an image sensor. First, an image frame is captured from the image sensor (step 600). The image frame may be captured in any number of ways as discussed above. The pixel values within the image frame are then reduced to provide one or more zone maps (step 602). Details regarding reducing an image frame into a number of zone maps are discussed above with respect to FIG. 3. One or more environmental conditions are then determined by processing the one or more zone maps in a neural network (step 604) which has been appropriately trained as discussed above. Again, by using the zone maps instead of image frames, the efficiency of environmental condition detection may be very high while still providing a high degree of reliability.

Any of the processes discussed with respect to FIGS. 2-4 and 8-9 may be performed by the lighting fixture 10 discussed above with respect to FIG. 1. Accordingly, the processes may be represented by instructions stored in the memory 22 and executed by the processing circuitry 20. The image sensor may be one of the sensors 26 in the sensor circuitry 24. In other embodiments, the image sensor may be remote from but in wired or wireless communication with the lighting fixture 10. In still other embodiments, the image sensor may be located in a lighting fixture but the processes discussed above may be performed remotely by one or more other devices such as a sensor module, a border router, or the like. Details about these components can be found in U.S. patent application Ser. No. 15/191,753, now U.S. Pat. No. 10,306,738, which is incorporated herein above. Alternatively, the processes discussed above may be provided as instructions on a non-transient computer readable medium containing program instructions for causing a computer to implement the processes as described.

The various ways to reliably and efficiently determine an occupancy state may be used to control a light output of a lighting fixture such as the one described above with respect to FIG. 1. When the occupancy state changes from unoccupied to occupied, the light output of the lighting fixture may be changed. For example, the lighting fixture may be turned on in response to such a change. Such a change may be enacted locally within the lighting fixture when the processes discussed above are locally executed or by a command provided from a remote device from the lighting fixture when they are not. Similarly, when the occupancy state changes from occupied to unoccupied, the light output of the lighting fixture may also be changed, or may change after some period of time (i.e., a timeout period). For example, the lighting fixture may be turned off in response to such a change. Once again, such a change may be enacted locally within the lighting fixture when the processes discussed above are locally executed or by a command provided from a remote device from the lighting fixture when they are not.

In an effort to further improve the accuracy of occupancy detection using an image sensor as discussed above, the lighting fixture 10 may include at least two image sensors in the sensor circuitry 24, or may include an image sensor with a binocular lens. Using multiple image sensors or an image sensor with a binocular lens may allow the lighting fixture 10 to determine or approximate a distance between an object seen by the image sensor and the image sensor itself. This may allow for the filtering of motion not due to desired persons/objects for which occupancy is to be detected (e.g., motion from insects flying near the image sensor) and thus increased accuracy of occupancy detection using the image sensor.

Methods for determining the distance of an object using binocular vision (either by virtue of multiple image sensors or a single image sensor with a binocular lens) will be readily appreciated by those skilled in the art. In one embodiment, pre-calibration of a per-pixel correlation between the multiple image sensors or the separate fields of view provided by an image sensor with a binocular lens is performed for one or more target operating distances, and binocular disparity between objects is used to determine a relative difference between objects and thus determine whether the motion provided therefrom should change an occupancy state of the lighting fixture 10.

Figure 10:
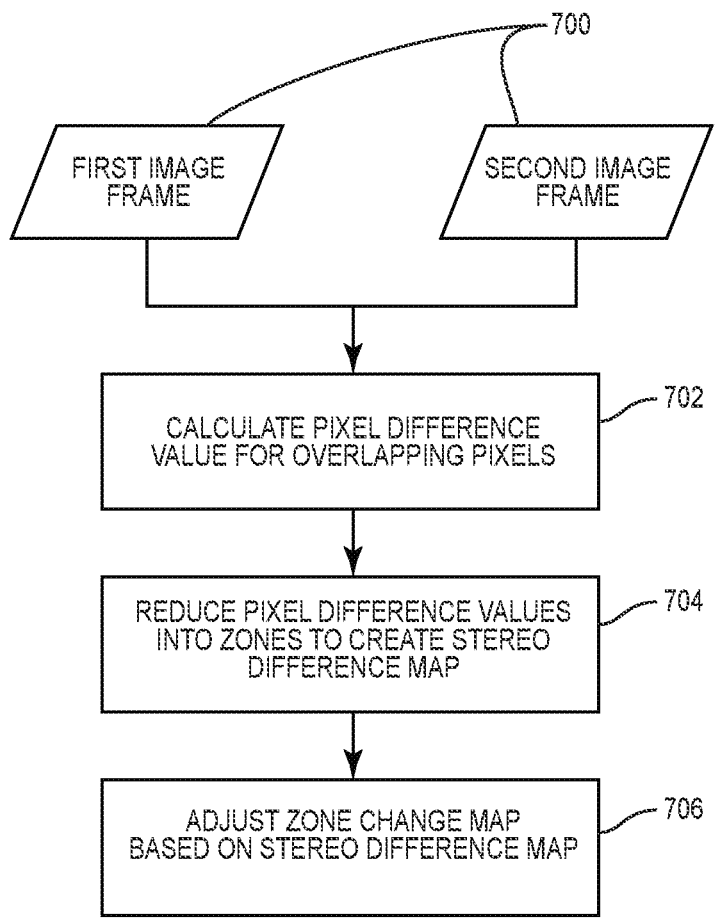
FIG. 10 is a flow chart illustrating a method for increasing the accuracy of occupancy determined from image data according to one embodiment of the present disclosure.

FIG. 10 is a flow chart illustrating a process for increasing the accuracy of occupancy detection using multiple image sensors and/or a single image sensor with a binocular lens. While the process is discussed with respect to separate image sensors, the same concepts apply to a single image sensor with a binocular lens, as will be appreciated by those skilled in the art. The process starts with a first image frame captured from a first image sensor and a second image frame captured by a second image sensor (step 700). A pixel difference value between overlapping pixel values in the first image frame and the second image frame is then taken (step 702). The pixel difference values may be aggregated by zone to obtain a stereo difference map (step 704), similar to the process discussed above with respect to FIG. 3 to obtain the zone change map. The stereo difference map is associated with a level of stereo disparity between the views provided by the separate image sensors (or the single image sensor with a binocular lens), and will increase when objects near the cameras are detected and decrease to zero at optical infinity. In an exemplary scenario where a desired plane for detecting occupancy is ten to sixty feet below the image sensors (e.g., a sidewalk is ten to sixty feet below an outdoor lighting fixture), the optics for the image sensors can be configured such that the target plane is effectively at optical infinity. The sum for each zone in the region of overlapping pixels may be normalized in some embodiments and then used to adjust the zone change map discussed above with respect to FIG. 4 and FIG. 6 to increase the accuracy of occupancy detection (step 706).

In one embodiment, each zone in the stereo difference map corresponds to a zone in the zone change map. The zone change value for each zone in the zone change map is adjusted using a stereo difference value for each corresponding zone in the stereo difference map. As discussed above, a higher stereo difference value indicates a greater amount of stereo disparity, and thus the zone change value may be reduced by an amount proportional to the stereo difference value in order to reduce the impact of motion that is not on the desired plane for detecting occupancy (e.g., insects very close to the image sensor) on the detection of occupancy. Accordingly, false positives in the detection of occupancy can be significantly reduced.

Those skilled in the art will recognize improvements and modifications to the preferred embodiments of the present disclosure. All such improvements and modifications are considered within the scope of the concepts disclosed herein and the claims that follow.

What is claimed is:

1. A method for determining occupancy of an area, the method comprising:
    obtaining a frame from an image sensor, the frame comprising a plurality of pixel values;
    separating the plurality of pixel values into a plurality of zones;
    detecting a change in a first subset of the plurality of pixel values above a first threshold with respect to a background frame;
    setting a first detection flag in a first zone of the plurality of zones and incrementing a detection flag counter in response to detecting the change in the first subset of the plurality of pixel values above the first threshold, wherein the detection flag counter indicates a number of detection flags from previous image frames that are present in the first zone or in other zones of the plurality of zones that share a border with the first zone; and
    determining an occupancy state of the area, wherein the occupancy state is determined to be occupied when the detection flag counter reaches a second threshold that corresponds to the detection flag counter being incremented to three.

2. The method of claim 1, further comprising:
    for each one of the plurality of zones, reducing corresponding pixel values in the one of the plurality of zones into a zone value;
    wherein detecting the change in the first subset of the plurality of pixel values above the first threshold comprises detecting a change in the zone value of the first zone above the first threshold with respect to the background frame.

3. The method of claim 2, wherein the zone value associated with each one of the plurality of zones is a mean luma value based on the pixel values in the one of the plurality of zones.

4. The method of claim 1, further comprising detecting a corresponding change in a second subset of the plurality of pixel values above a third threshold with respect to the background frame.

5. The method of claim 4, further comprising verifying the occupancy state based on a relationship between the change in the first subset of the plurality of pixel values and the change in the second subset of the plurality of pixel values.

6. The method of claim 4, wherein the first threshold is substantially equal to the third threshold.

7. The method of claim 4, further comprising:
    for each one of the plurality of zones, reducing corresponding pixel values in the one of the plurality of zones into a zone value;
    wherein detecting the change in the first subset of the plurality of pixel values above the first threshold comprises detecting a change in a first zone value associated with the first zone above the first threshold with respect to the background frame.

8. The method of claim 7, wherein:
    the first subset of the plurality of pixel values corresponds with the first zone and the second subset of the plurality of pixel values corresponds with a second zone adjacent to the first zone; and
    detecting the corresponding change in the second subset of the plurality of pixel values comprises detecting a change in a second zone value associated with the second zone above the third threshold with respect to the background frame.

9. The method of claim 8, wherein:
    detecting the change in the first subset of the plurality of pixel values comprises determining a first difference between the first zone value and a corresponding value of the first zone from the background frame; and
    detecting the corresponding change in the second subset of the plurality of pixel values comprises determining a second difference between the second zone value and a corresponding value of the second zone from the background frame and comparing a direction of the first difference and a direction of the second difference.

10. The method of claim 9, further comprising verifying the occupancy state to be occupied when the direction of the first difference and the direction of the second difference are opposite.

11. The method of claim 7, wherein the zone value associated with each one of the plurality of zones is a mean luma value based on the corresponding pixel values in the one of the plurality of zones.

12. The method of claim 4, wherein:
    the change in the first subset of the plurality of pixel values is based on a difference between the first subset of the plurality of pixel values and a running average of the first subset of the plurality of pixel values from the background frame; and
    the change in the second subset of the plurality of pixel values is based on a difference between the second subset of the plurality of pixel values and a running average of the second subset of the plurality of pixel values from the background frame.

13. The method of claim 1, wherein the plurality of pixel values comprises luma values.

14. A lighting device, comprising:
processing circuitry; and
a memory coupled to the processing circuitry, the memory storing instructions which, when executed by the processing circuitry, cause the lighting device to:
  obtain a frame from an image sensor, the frame comprising a plurality of pixel values;
  separate the plurality of pixel values into a plurality of zones;
  detect a change in a first subset of the plurality of pixel values above a first threshold with respect to a background frame;
  set a first detection flag in a first zone of the plurality of zones and increment a detection flag counter in response to detecting the change in the first subset of the plurality of pixel values above the first threshold, wherein the detection flag counter indicates a number of detection flags from previous image frames that are present in the first zone or in other zones of the plurality of zones that share a border with the first zone; and
  determine an occupancy state of the area, wherein the occupancy state is determined to be occupied when the detection flag counter reaches a second threshold that corresponds to the detection flag counter being incremented to three.

15. The lighting device of claim 14, wherein the lighting device is a lighting fixture comprising a solid-state light source.

16. The lighting device of claim 15, further comprising power converter circuitry coupled to the solid-state light source and the processing circuitry, wherein the memory stores further instructions which, when executed by the processing circuitry, cause the lighting device to control a light output of the solid-state light source via the power converter circuitry based on the occupancy state.

17. The lighting device of claim 14, wherein the lighting device is a lighting controller comprising communications circuitry.

18. The lighting device of claim 17, wherein the memory stores further instructions which, when executed by the processing circuitry, cause the lighting device to control a light output of another lighting device.

19. The lighting device of claim 14, wherein the memory stores further instructions which, when executed by the processing circuitry, cause the lighting device to detect a corresponding change in a second subset of the plurality of pixel values above a third threshold with respect to the background frame.

20. The lighting device of claim 19, wherein the memory stores further instructions which, when executed by the processing circuitry, cause the lighting device to verify the occupancy state based on a relationship between the change in the first subset of the plurality of pixel values and the change in the second subset of the plurality of pixel values.

* * * * *